United States Patent [19]
Solberg, Jr.

[11] Patent Number: 6,045,599
[45] Date of Patent: Apr. 4, 2000

[54] RENEWABLE FILTER

[75] Inventor: Charles Solberg, Jr., Barrington, Ill.

[73] Assignee: Solberg Manufacturing, Inc., Itasca, Ill.

[21] Appl. No.: 09/192,029

[22] Filed: Nov. 13, 1998

[51] Int. Cl.$^7$ ............................................. B01D 29/05
[52] U.S. Cl. .............................. 55/498; 55/499; 55/503; 55/511; 55/521
[58] Field of Search ........................... 55/498, 503, 511, 55/521, 522, 491, 499, 519; 40/232, 440, 497.3, 493.3; 257/704

[56] References Cited

U.S. PATENT DOCUMENTS

| | | | |
|---|---|---|---|
| 1,639,170 | 8/1927 | Fell | 210/440 |
| 3,486,626 | 12/1969 | Close | 55/498 |
| 4,588,426 | 5/1986 | Virgille et al. | 55/498 |
| 4,878,930 | 11/1989 | Manniso et al. | 55/501 |
| 5,100,551 | 3/1992 | Pall et al. | 55/501 |
| 5,133,315 | 7/1992 | Reese | 55/522 |
| 5,178,760 | 1/1993 | Solberg, Jr. | 210/493.3 |
| 5,825,085 | 10/1998 | Masumoto et al. | 257/704 |

*Primary Examiner*—David A. Simmons
*Assistant Examiner*—Minh-Chau T. Pham
*Attorney, Agent, or Firm*—Lee, Mann, Smith, McWilliams, Sweeney & Ohlson; Robert F. I. Conte

[57] ABSTRACT

A reusable replacement filter includes a folded elongated filter element. The filter has a cup shaped member which includes a base element. The cup shaped member has a continuous side wall extending upwardly from the periphery of the base element. The cup shaped member has an open end. A plurality of longitudinally disposed rib elements are disposed along opposed portions of the side wall. A removable ring is juxtaposed to the open end of the side wall. The ring has a plurality of fingers which extend axially in an offset complimentary fashion to the rib elements. The ring and cup have means for telescopically engaging the ring to the cup. A removable cap closes the open end of the cup member. The cap and cup each have an aperture for communicating with the exterior of the filter. The apertures allow a fluid to be passed through and cleaned by the filter element.

9 Claims, 2 Drawing Sheets

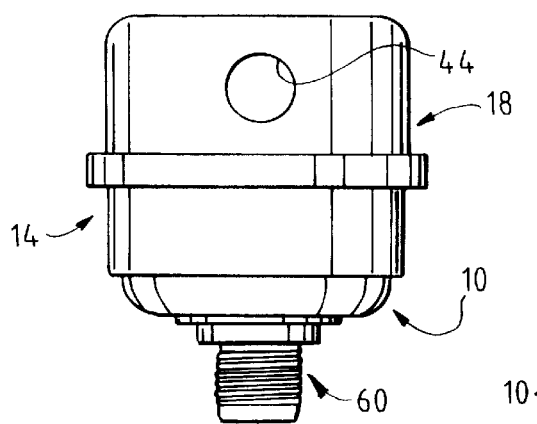
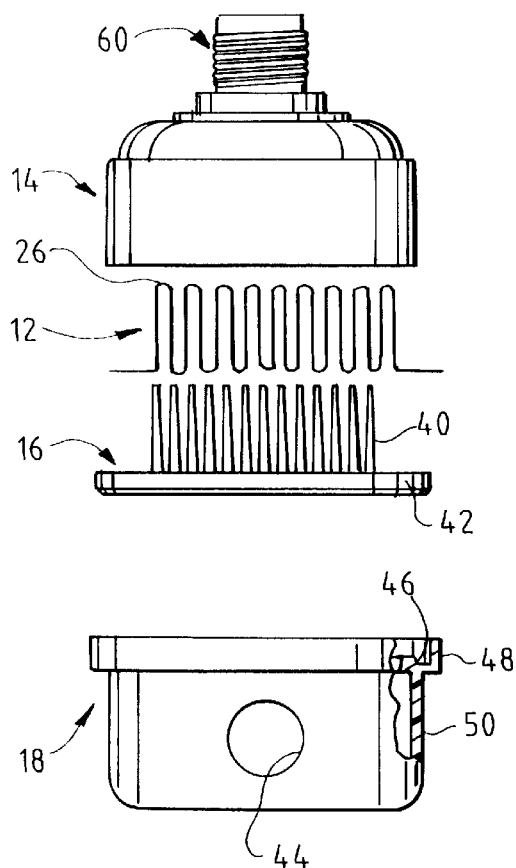
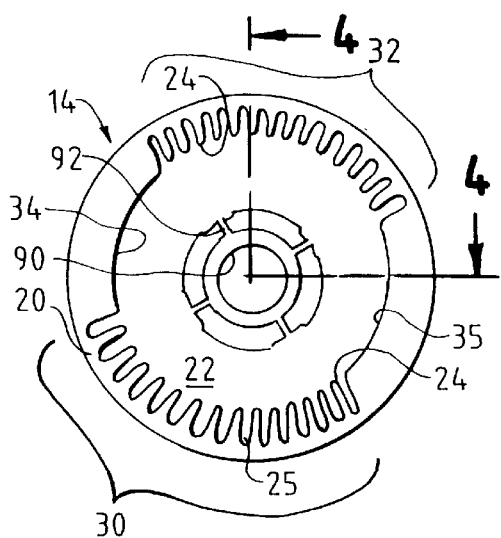
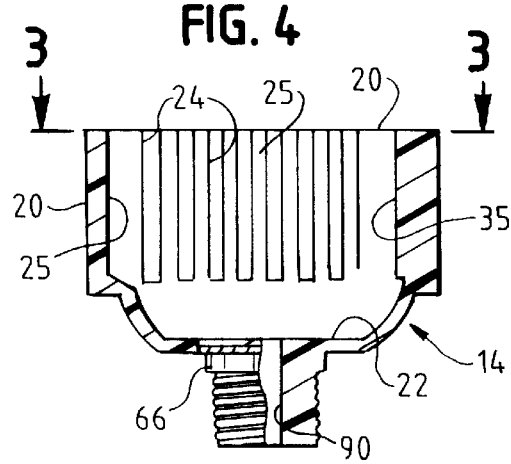

RENEWABLE FILTER

BACKGROUND OF THE INVENTION

This invention relates in general to the construction of air filters and, more specifically, filters for industrial applications, i.e. compressors, vacuum pumps and the like; and in particular, a new and useful filter wherein it is now possible to replace the filter element inexpensively without having to discard and replace the more expensive container as has been done in the past. The filter element chosen in this primary example is a filter formed of a folded fiber filter material with the filter element being captured and retained by a plurality of inter-engaging ribs and fingers which project into the recesses created by the folding of the fibrous filter element. Disengagement of the ribs and fingers permits the removal of the soiled filter and introduction of a new clean filter element.

DESCRIPTION OF THE PRIOR ART

A filter element for suspended material as used in air filters is known which consists of a folded web of filtration material captured between a pair of rings having opposed edges with interengageable ring parts with complimentary projections and recesses corresponding to the folds of the folded filter web. The rings and said projections are coated with an adhesive prior to assembly are coated with an adhesive to insure their secure attachment to the filter web and opposing ring. Such a device can be found in U.S. Pat. No. 3,873,288 issued Mar. 25, 1975 jointly to Karl August Wachter and Horst Muller. The excess web width is cut or ripped off to the boundaries. Another known method for the production of a filter element is shown in my U.S. Pat. No. 5,178,760, wherein said filter web is provided with a variable web width that then is pleated to a final configuration that is complimentary to the shape and size of the accommodating container to thereby eliminate waste and production time.

SUMMARY OF THE INVENTION

In accordance with the present invention, there is provided a filter for suspended material that may be manufactured easily and which is removable and replaceable by a segment of folded web material inserted in the original filter body. The filter body includes an open mouth cup-shaped container having at least two groups of axially extending, circumferentially spaced ribs positioned in opposition along the inner wall of said cup forming a plurality of tapered recesses adapted to except depending folds of said web. A ring-shaped retainer, having a plurality of depending tapered fingers substantially equal in number to said recesses and spaced in matching fashion to said recesses.

The ring is removable and subsequently the dirty web can be removed and the cup-shaped receptacle cleaned, if necessary. A fresh strip of folded web inserted followed by reinsertion of the retaining ring produces a clean filter.

Heretofore, filters, which normally are positioned in an operating line passing sediment carried air or other fluid materials, introduce the flow in the upper chamber opposite the location of the filter material. The flow normally is introduced tangentially circumferentially the pressure of the flow is not directly onto the filter material. This results in a longer life span for the filter. The opposite or exit end of the filter preferably has a pipe thread fitting. In the past this normally is a screw-machine part suitably mounted in line with the drain aperture beyond the filter material. This is a time consuming costly item in the manufacture of the filter device. In the present invention a novel thin-wall sheet metal stub is insert molded into the filter receptacle when is fabricated thereby eliminating an expensive secondary operation plus the heavier more costly screw-machine part previously used.

BRIEF DESCRIPTION OF THE DRAWINGS

FIG. 1 is a vertical elevation of an assembled filter according to the present invention;

FIG. 2 is an expanded view of the various parts of the present invention in disassembled array;

FIG. 3 is an end view in partial section of the open ended cup-shape receptacle for acceptance of the filter material; as viewed along line 3—3 in FIG.4;

FIG. 4 is an elevational view, in partial section, of the receptacle as viewed along line 4—4 in FIG. 3;

GENERAL DESCRIPTION OF THE PREFERRED EMBODIMENT

Figure 5:
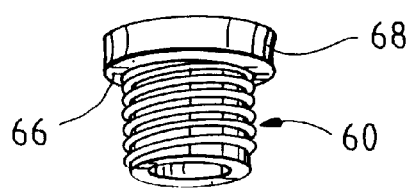
FIG. 5 is an elevational view in perspective of the thin walled sheet-metal insert.
Figure 6:
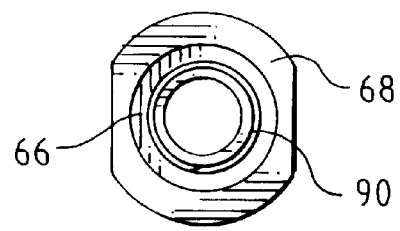
FIG. 6 is an end plan view of the insert, as viewed along line 6—6 in FIG. 5.

Referring to the drawings in particular, the invention embodied therein, the device relates to an improved filter device designated 10 which comprises a replaceable filter element 12; a receptacle 14 (which will be described in greater detail hereinafter); a retaining ring 16, and an open-ended cap 18 for closing and embracing the open end of receptacle 14.

As best seen in FIGS. 3 and 4, the open ended receptacle 14 includes a substantially continuous side wall 20 tapering down to a centrally apertured end wall 22. The side wall 20 includes at least two groups of axially extending ribs 24 that are circumferentially spaced to form a similar number of cavities 25 each capable of accepting a creased fold 26 of the pleated web of filter material 12. The spaced groups 30–32 of ribs 24 and cavities 25 extend outwardly from wall 20 on opposite sides of the centerline of receptacle 14 and each strike an arc whereby the end closest ribs 24 are positioned a distance substantially equal to the width of the web 12. The wall 20 supports a pair of substantially thicker portions 34–35 which space the two groups of ribs and cavities and serve further as support surfaces when the pleated web is flattened as will be seen.

When the pleated web 14 has been inserted into the cavities 25 the retaining ring 16 with its teeth or arms 40 which are complimental to the cavities 25 and push the filter material into tight engagement with the ribs 24. It has been found desirable to have the teeth or arms 40 canted radially outward from the axis of ring 42 so that when inserted in cavities 25 there is a firm engagement between the cavity wall and its adjacent arm 40. They serve as a shut mechanism relative to the minimal leakage of the fluid being filtered. The ring 42 compresses the web12 extending beyond the groups 30–32 against the thickened wall portions 34–35 as well as engaging the top edge of wall 20, as viewed in the drawings The cover 18 is an open ended member having a peripheral flange 46 for engagement with the top of wall 20. It also has a depending flange 48 for engagement with the lip of wall 20. The cover 18 has a side wall 50 carrying an aperture 40 for introduction of the fluid, either fluid or gaseous, to be filtered. Suitable fastening means, not shown, can be used to provide admission through aperture 40, the choice being that of the user.

Figure 7:
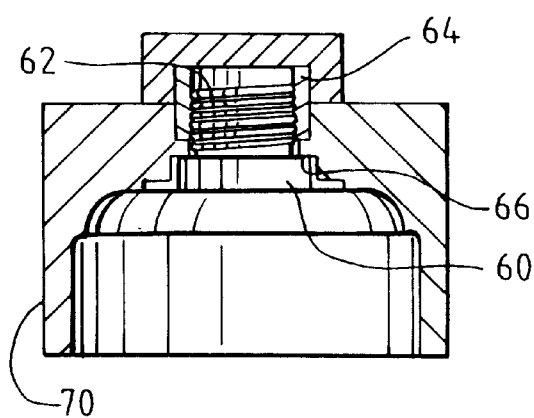
FIG. 7 is a sectional view in inverted position of the cavity used to form the receptacle, with the sheet metal insert in place prior to the injection molding.
Figure 8:
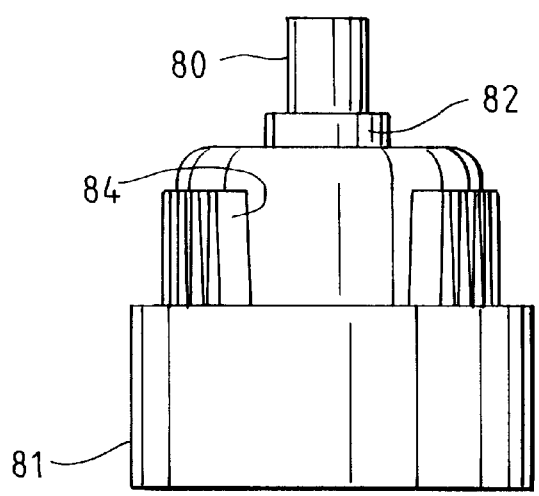
FIG. 8 is an elevational view of the core insert block used in cooperation with the cavity insert block to form the interior of the receptacle shown in FIG. 7.

At the opposite end of the filter 10 and extending outwardly from the bottom wall 22 receptacle 14 is a threaded pipe nipple 60 for carrying off the effluent of the filter. As was previously indicated the prior devices normally utilized an expensive screw-machine flanged part As part of the present invention there is provided a thinwalled sheet metal part that is insert molded as part of the receptacle. As can be seen in FIGS. 7–8, the insert includes shaft 62 with the rounded threads extending though the thin material so that its threaded both inside and out. Threads 62 are tapered so that they will engage the tapered shut-off ring 64 which is positioned within the cavity insert block 70, see FIG. 7. The shaft includes a shouldered enlargement 66 and a non-circular head 68. When the core insert block 81 is inserted into the cavity insert block 70 the threaded insert holder 80 is radially spaced from its inner wall 62, while shoulder means 82 fits within the cavity formed with shoulder 66 and forces against shoulder 66 and serve as cut-off means while molten plastic material passes between said holder 80 and the inside of the threaded portion to create smooth interior bore 90 and complimentary threaded exterior engaging the inner threaded wall. This prevents axial movement of this axially extending cylindrical tube. To prevent possible rotation of this tube, radial straps 92 are spaced in quadrature and connect the upper end with base wall 22.

While it was not mentioned previously, the positioning of aperture 44 in the sidewall 50 of cap 18 was intentionally directed to prior filtration practice of avoiding direct passage of incoming fluids against the filter material. This gives longer life to the filter while the side entrance of entraled fluids causes them to follow a tangential path and mix he fluid before contact with the filter material and does a better job.

While a specific embodiment of the invention has been shown and described in detail to illustrate the application of the principles and advantages of the invention, it will be understood that the invention may be embodied otherwise without departing from such principles.

I claim:

1. A reusable replaceable filter construction comprising: a folded filter element, a cup-shaped member including a base element, said member having a continuous sidewall extending upwardly from the periphery of said base element and forming said cup-shaped member having one open end, a plurality of longitudinally disposed rib elements circumferentially spaced relative to each other and consisting of independent groups of said spaced ribs the groups being disposed in opposition along opposed portions of said sidewall, a removable ring member, said ring member having a plurality of fingers extending axially in an offset complimentary fashion to said rib elements, a ring engaged position, wherein in said engaged position, said rib elements grip a length of said filter element to removably position said filter element within said cup member, a removable cap having an engaged position, wherein in said engaged position, said cap engages said cup member at said open end, said cup and cap each having means for communicating with the exterior of said filter whereby a fluid can be passed through and cleansed by said filter element.

2. The filter claimed in claim 1 wherein said groups of ribs are radially spaced a distance equal to the width of said filter element and wherein said ribs extend radially inward from an interior surface of said sidewall.

3. The filter claimed in claim 2 wherein, in said ring engaged position, said filter element has a plurality of folds, each of said folds within the spaces between adjacent ribs.

4. The filter claimed in claim 3, wherein said ring fingers are also disposed within said spaces and clamp said filter element there between.

5. The filter claimed in claim 4, wherein said ring fingers are circumferentially tapered toward their free end and also biased radially outwardly, whereby said fingers not only clamp said filter element against said adjacent ribs but also seal against the side wall from which the ribs project, thereby preventing leakage of said fluid.

6. A filter having a three piece housing, the lower piece being an open ended cup for accepting a filter element and a cover, said cup including a central opening and an insert molded thin-walled tapered threaded fitting with a laterally extending apertured head said head including means to prevent rotation.

7. A thin-walled fitting having a tapered shaft said tapered shaft including an internal female thread and an external male thread formed in its thin material, a laterally extending thin non-circular substantially flat head, an enlarged diameter non-threaded shoulder means spaced from said head, the balance of said tapered shaft carrying said interior/exterior thread form, said thin walled fitting being insert molded with said head and shoulder means being enclosed in suitable thermoplastic material while said tapered shaft carries an interior reinforcing cylinder, the interior bore thereof being substantially smooth, while the exterior of said cylinder conforms to the interior thread-form and reinforces said thin wall fitting, and means extending radially from one end of said cylinder to said insert molding surrounding said shoulder means to prevent circumferential movement thereof.

8. A core block and a cavity block for fabrication of the filter housing of claim 5 comprising: an open ended cavity insert block having a stepped bore terminating in a through open stepped bore which holds said threaded insert, a concentric cylindrical portion adjacent the open end of said bore to accept a complementary cylindrical ring having a tapered inner bore for supporting said tapered threaded insert and serve as a shut-off, said insert block including a main body, a stepped cylindrical member serving as the threaded insert holder during molding and at least two groups of circumferentially spaced axially extending ribs for creating said ribs in said cup member, whereby said tapered threaded insert holder will readily extract from said tapered threaded portion of said insert.

9. The filter claimed in claim 1 wherein, in the ring engaged position, the fingers extend longitudinally into an interior of the cup member, and wherein the filter element's folds are oriented to lie along a plane.

* * * * *